June 3, 1952 E. E. WEMP 2,599,214
MECHANISM FOR TRANSMITTING TORQUE
Filed April 9, 1948 10 Sheets-Sheet 1

INVENTOR.
Ernest E. Wemp
BY
Barnes, Kisselle, Laughlin & Raisch
ATTORNEYS.

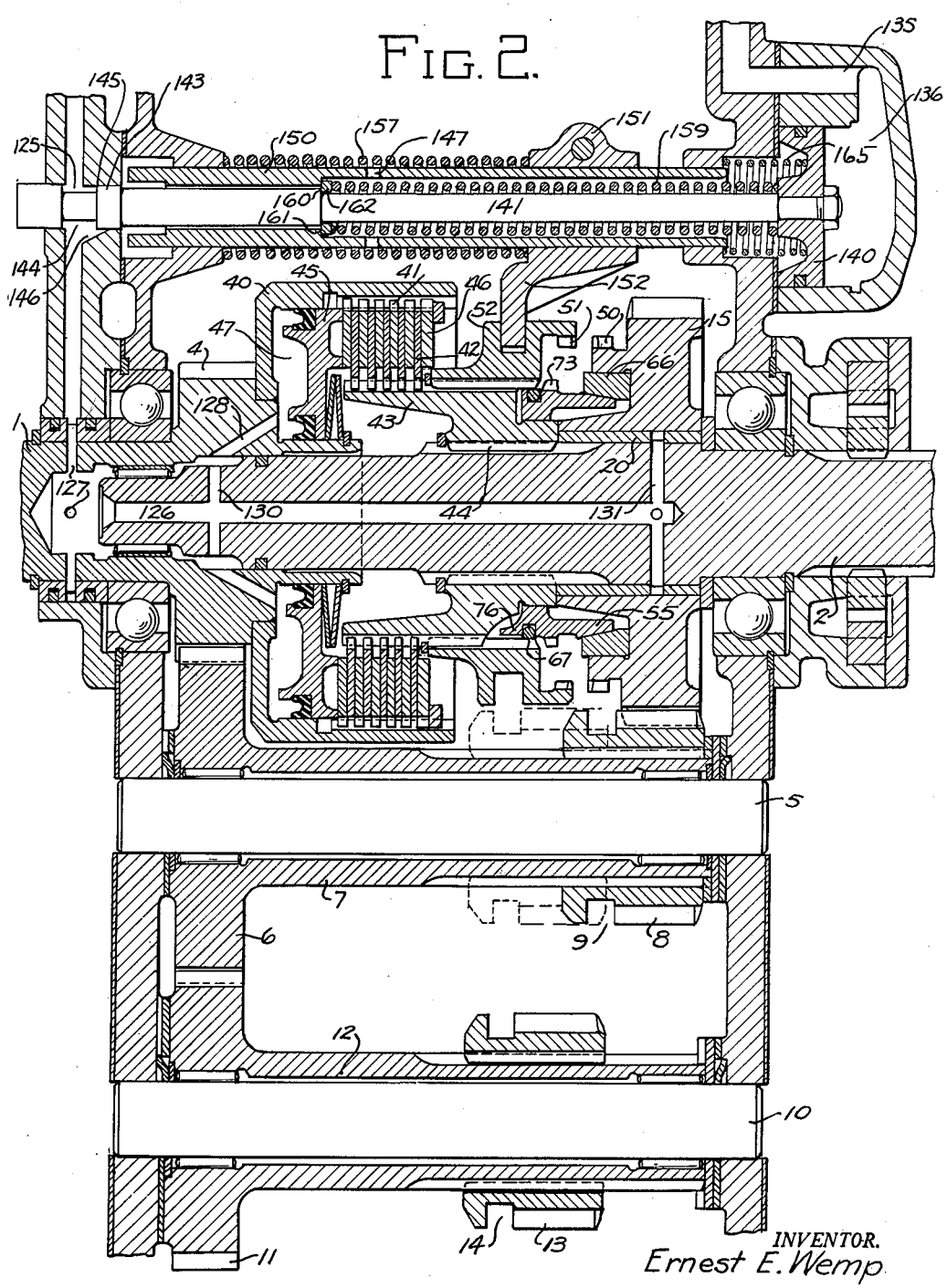

June 3, 1952 — E. E. WEMP — 2,599,214

MECHANISM FOR TRANSMITTING TORQUE

Filed April 9, 1948 — 10 Sheets-Sheet 3

INVENTOR.
Ernest E. Wemp
BY
Barnes, Kisselle, Laughlin & Raisch
ATTORNEYS.

June 3, 1952  E. E. WEMP  2,599,214
MECHANISM FOR TRANSMITTING TORQUE
Filed April 9, 1948  10 Sheets—Sheet 4
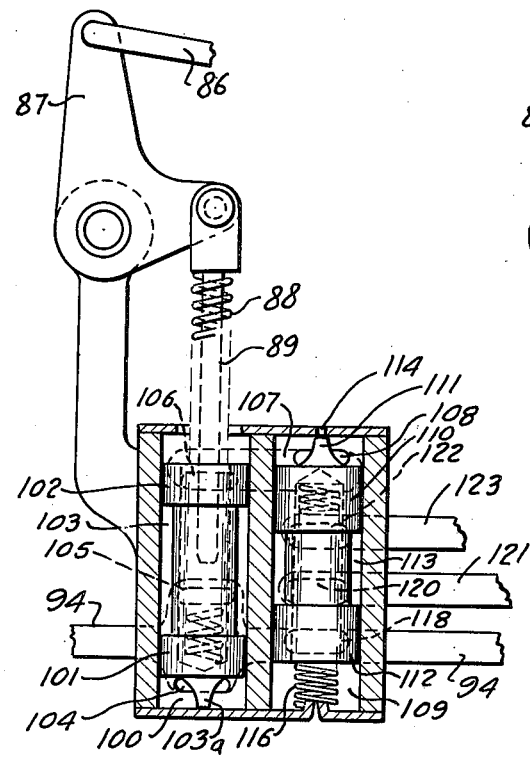
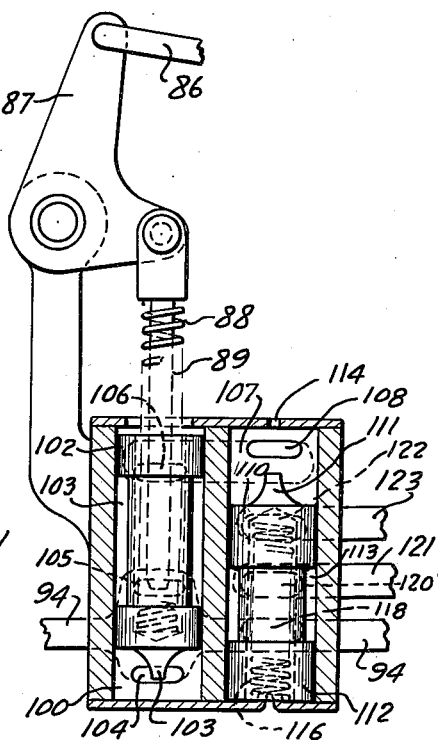
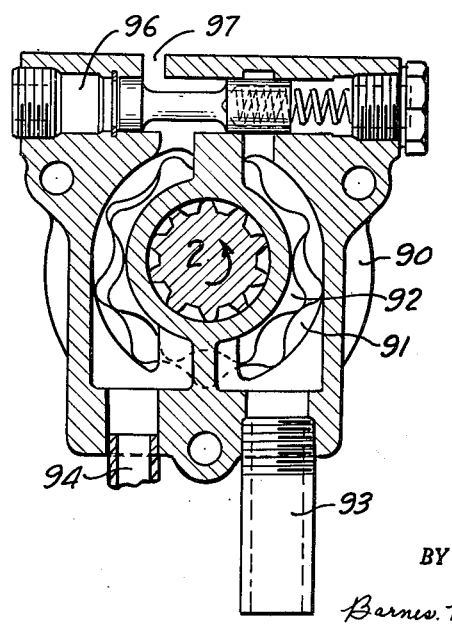
INVENTOR.
Ernest E. Wemp
BY
Barnes, Kisselle, Laughlin and Raisch
ATTORNEYS June 3, 1952     E. E. WEMP     2,599,214
MECHANISM FOR TRANSMITTING TORQUE
Filed April 9, 1948     10 Sheets-Sheet 5

INVENTOR.
Ernest E. Wemp
BY
Barnes, Kisselle, Laughlin & Raisch
ATTORNEYS

June 3, 1952  E. E. WEMP  2,599,214
MECHANISM FOR TRANSMITTING TORQUE
Filed April 9, 1948  10 Sheets-Sheet 6
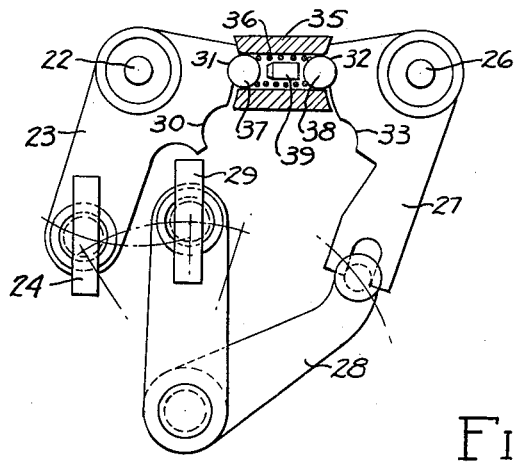
FIG. 8.
FIG 12.
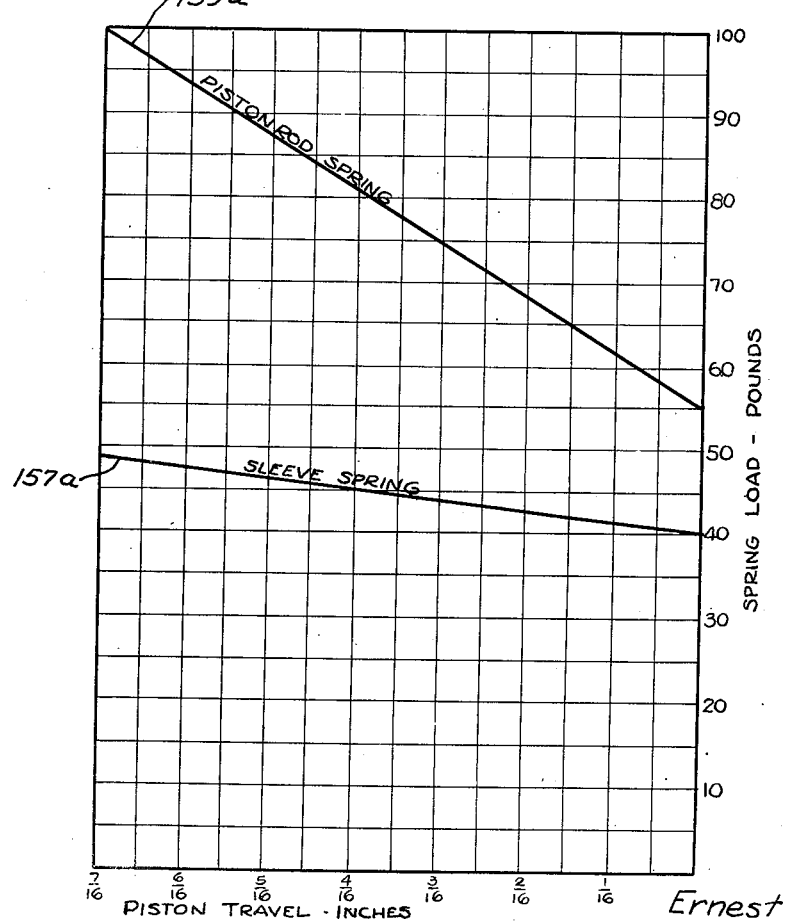
INVENTOR.
Ernest E. Wemp
BY
Barnes, Kisselle, Laughlin & Raisch
ATTORNEYS.

June 3, 1952  E. E. WEMP  2,599,214
MECHANISM FOR TRANSMITTING TORQUE
Filed April 9, 1948 10 Sheets-Sheet 7

INVENTOR.
Ernest E. Wemp
BY
ATTORNEYS

INVENTOR.
Ernest E. Wemp

June 3, 1952  E. E. WEMP  2,599,214
MECHANISM FOR TRANSMITTING TORQUE
Filed April 9, 1948  10 Sheets-Sheet 9

INVENTOR.
Ernest E. Wemp
BY
Barnes, Kisselle, Laughlin and Raisch
ATTORNEYS

June 3, 1952     E. E. WEMP     2,599,214
MECHANISM FOR TRANSMITTING TORQUE
Filed April 9, 1948     10 Sheets-Sheet 10

INVENTOR.
Ernest E. Wemp
BY
Barnes, Kisselle, Laughlin and Raisch
ATTORNEYS

Patented June 3, 1952

2,599,214

UNITED STATES PATENT OFFICE 2,599,214

MECHANISM FOR TRANSMITTING TORQUE

Ernest E. Wemp, Detroit, Mich.

Application April 9, 1948, Serial No. 20,002

25 Claims. (Cl. 74—364)

This invention relates to a transmission and it has to do particularly with a torque transmitting apparatus capable of establishing torque transmitting connections between a driving member and a driven member at different speed ratios. This application is a continuation in part of application Serial No. 646,982, filed February 12, 1946, now abandoned, titled Mechanism for Transmitting Torque.

The general and overall objects of the invention are to provide a torque transmitting apparatus and transmission of an improved construction for automatically shifting or changing from one driving ratio to another. The transmission is useful with internal combustion engines and an understanding of the invention may probably be best obtained by visualizing the transmission as used in an automotive vehicle. Accordingly, it will so be described herein although the invention is not limited to such use.

In accordance with the invention the transmission may, and preferably is, under the combined control of torque and speed to the end that an automatic shift is made as determined by the requirements of torque and speed. It, of course, is appreciated by those skilled in the art that an internal combustion engine may at times operate at quite a low speed and with low torque as, for example, when cruising slowly on a level highway with a high ratio coupling between the engine and the traction wheels. On the other hand, there are times when higher speeds exist and also a higher torque is transmitted thus requiring a lower driving ratio between the engine and the traction wheels notwithstanding the relatively higher speed. This latter condition may be obtained upon rapid acceleration or when traveling up an incline. Accordingly, the control, governed by both speed and torque may be arranged so that a desirable ratio is obtained for a given set of conditions.

The transmission of this invention embodies coupling means, considering now the transmission in its simplest form where only two ratios are obtained, and when a shift is made from one ratio to another while torque is being transmitted, there is a certain bucking or opposing action of one coupling against the other. This represents a loss of energy but the present invention is arranged to minimize the loss during the change. In this connection, one of the couplings is preferably a clutch capable of slipping while the other connection is preferably one of the dentally engaging type. This feature will be better appreciated as the following detailed description is considered.

A further object of the invention is to provide novel controlling means for governing the action of the transmission by torque and speed. This is accomplished primarily by a liquid pressure system which may be termed a hydraulic system in conjunction with the position of the throttle or accelerator. This dispenses with complicated mechanism such as centrifugal governors or the like. A still further object of the invention is an improved arrangement in a transmission of the gearing and shafting for the obtaining of the different ratios and for the obtaining of a reverse drive. This arrangement provides an exceptionally compact structure with a minimum number of gears and embodies an interlocking control in connection with some of the shiftable gears.

The invention will be better understood and the above and other objects appreciated as the following description is considered in conjunction with the accompanying drawings wherein one form of apparatus for carrying out the invention is illustrated.

Fig. 2 is a cross sectional view of developed nature similar to Fig. 1 illustrating the transmission in another condition and also illustrating an additional shaft in the transmission, the view being taken substantially on section lines A, B, C, D, E and F of Figs. 6 and 7.

Fig. 3 is an enlarged view of the pressure control valves showing the valves positioned for maintaining the transmission in the condition shown in Fig. 1.

Fig. 4 is a view similar to Fig. 3 showing the control valves positioned for the transmission condition shown in Fig. 2.

Fig. 5 is a cross sectional view showing a liquid pump for providing the liquid under pressure.

Fig. 8 is a view in side elevation with some parts shown in section showing the controls for the gearing.

Fig. 12 is a diagrammatic view illustrating the spring rate curves of the springs associated with the controlling mechanism.

Figure 1:
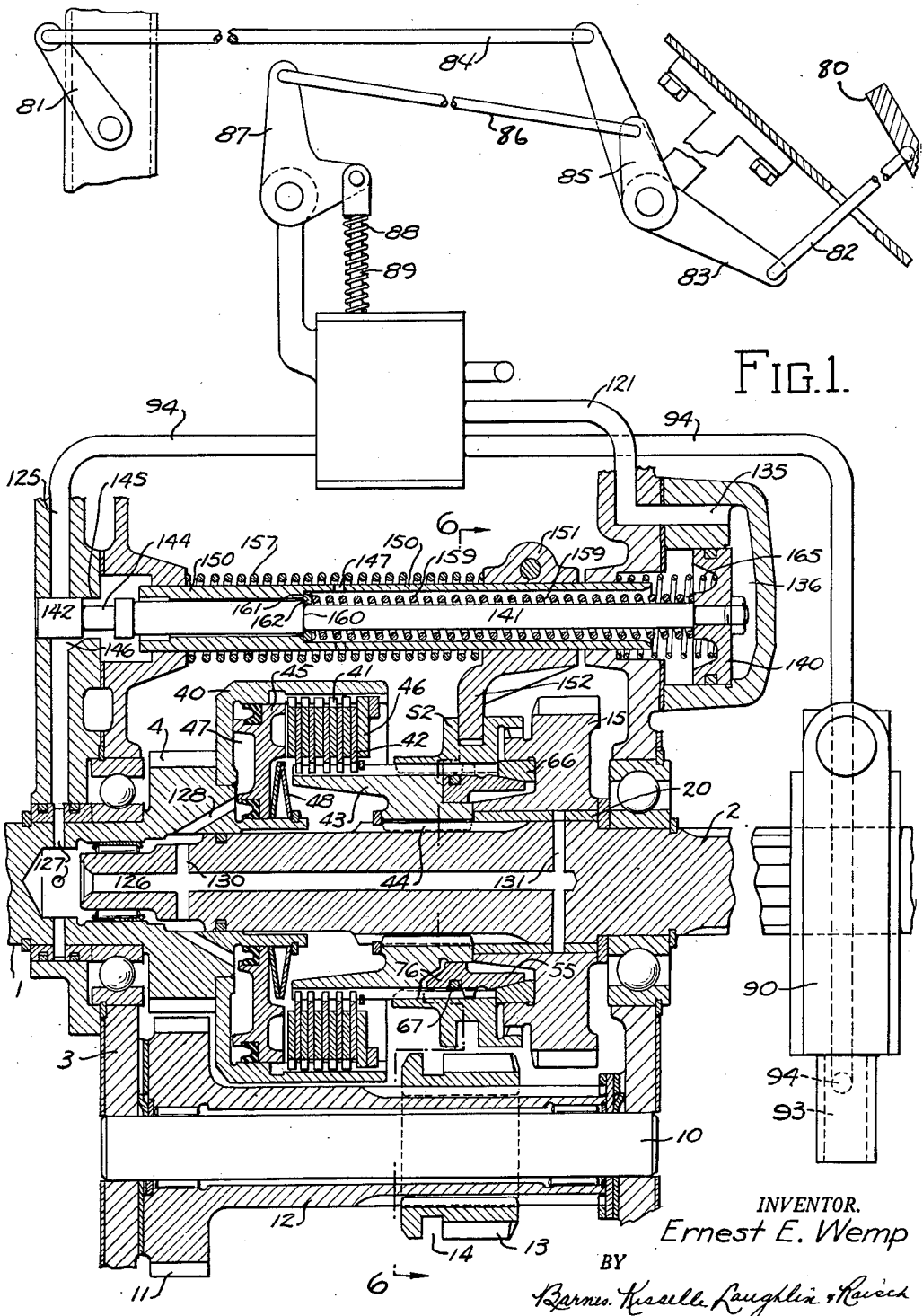
Fig. 1 is a cross sectional view of developed nature taken through a transmission constructed in accordance with the invention and illustrating the interior structure of the transmission itself as well as the controls, the view being taken substantially on lines A, B, C, E, and F of Figs. 6 and 7.

As illustrated in Fig. 1 there is a power input or driving shaft 1 which may be suitably coupled to an internal combustion engine and an output or driven shaft 2 which may be coupled to the traction wheels of a vehicle or other driven means. The transmission case or housing is illustrated at 3 and the shaft 1 is journalled therein as shown and is provided with a gear 4. A counter-shaft 5 (Fig. 2) has a gear 6 thereon, the teeth of which mesh with the teeth of gear 4. The gear 6 has an extending hub 7 and slidably mounted thereon is a gear 8 with a groove 9 so that it may be shifted. The counter-shaft 5 is for a low gear arrangement in the transmission. Shown in both Figs. 1 and 2 is a second or reverse shaft 10 with a gear 11 thereon, the teeth of which mesh with those on the gear 6. The gear 11 has a hub 12 slidably mounted upon which is a gear 13 with a groove 14 for receiving an operating shoe. Mounted upon the driven shaft 2 is a gear 15 so that its teeth may mesh with those of the gear 8 and the gear 13 and the gear train 4, 6, 8 and 15 constitutes speed change means. The gear 15 is journalled on the shaft 2 by suitable means as shown at 20.

Figure 7:
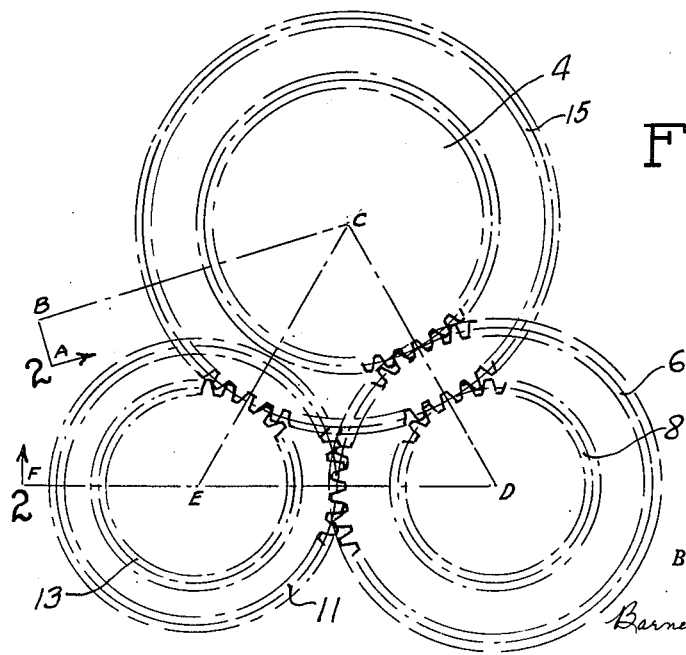
Fig. 7 is a diagrammatic view illustrating the relationship of the gears.

The several shafts and gears are compactly arranged as illustrated in Fig. 7. It will be noted that the centers D and E of the shafts 5 and 10 are equi-distant from the center of the shafts 1 and 2 and that the several gears are compactly arranged and are selected as to size to provide the proper dental engagement in some cases and clearance in others. As a specific example, to which the invention is obviously not limited, the gear 4 may have 27 teeth with a corresponding appropriate diameter. The gear 6 is a little larger and may have thirty teeth. The gear 11 is in the same plane as the gears 4 and 6 but the teeth thereof have a clearance relative to the teeth on gear 4 and mesh with the teeth on gear 6. The gear 11 in this example has 27 teeth. The gears 8 and 13 have sixteen teeth and mesh with the larger gear 15 which has thirty-two teeth. It will accordingly be seen that when torque is transmitted from the gear 4 through gear 6, through gear 8, to gear 15, that the gear 15 rotates at a lower speed than the gear 4. Likewise, if torque be transmitted from gear 4 through gear 6, gear 11, gear 13, to gear 15, that the gear 15 is operated with a reverse direction of rotation.

Figure 6:
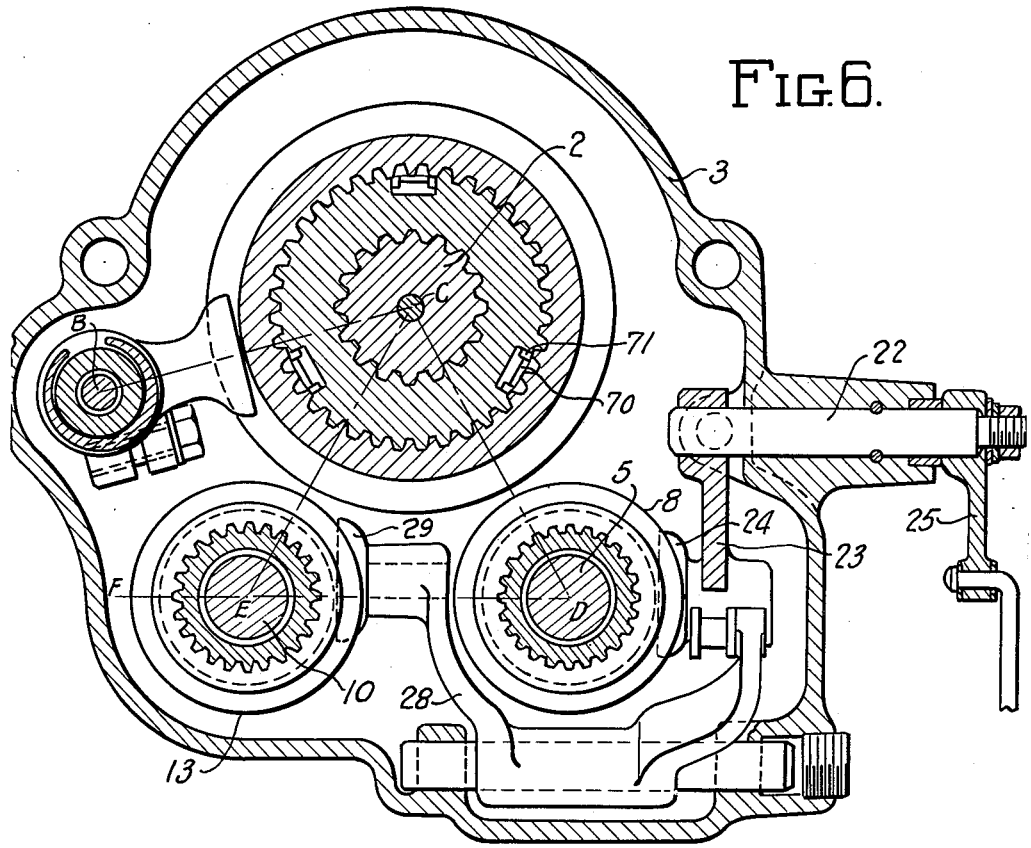
Fig. 6 is a cross sectional view taken substantially on line 6—3 of Fig. 1 illustrating the gearing arrangement and the controls therefor.

It will be apparent that both the gears 8 and 13 must not be in dental engagement with the gear 15 at the same time, since gears 8 and 13 are always rotating but in opposite directions. A control for the shifting of the gears 8 and 13 is shown in Figs. 6 and 8. There is a rock shaft 22 which operates through an arm 23 for shifting a shoe 24 which is engaged in the slot 9 of the low speed gear 8. Oscillation of the rocker shaft shifts the gear 8 to and from the full and dotted line position shown in Fig. 2. In one position the gear has its teeth engaged with those of gear 15 and in the other position it is free of the gear 15. This rock shaft may be controlled by a suitable arm or lever 25. Another similar rock shaft 26 has an arm 27 which oscillates a yoke 28 as shown in Fig. 6, to shift a shoe 29 which is positioned in the groove 14 of reverse gear 13.

These two controls are interlocked as shown in Fig. 8 so that only one of them can be moved at a time and so that only one may be positioned to engage with the gear 15. To this end the arm 23 has a segment with a relatively deep notch 30 and a relatively shallow notch 31; the arm 27 has a segment with a relatively deep notch 32 and a relatively shallow notch 33. A fixed bracket 35 lying between the segments houses a coil spring 36 which acts upon two balls, as shown at 37 and 38. Between the two balls is a pin 39. As illustrated in Fig. 8, the control arm 27 is locked in position because the ball 38 is in the deep notch 32. The pin 39 engages ball 37 and blocks ball 38 so that it cannot move entirely out of notch 32. However, the arm 23 may be shifted. When the arm 23 is shifted so that the ball 37 fits into the relatively deep notch 30 then the arm 27 may be shifted. And when the arm 27 is shifted so that the ball 38 seats in the shallow recesses 33 then the arm 23 is locked. The arrangement is such that when the gear 8 is engaged with the gear 15 as shown in Fig. 2, the ball 37 is in the shallow notch 31, as shown in Fig. 8, and at this time the arm 27 is in the position shown in Fig. 8, so that the gear 13 is out of engagement with gear 15 and cannot be moved into engagement therewith. Likewise, when the gear 13 is engaged with gear 15 the ball 32 is in the shallow notch 33 and the arm 23 cannot be moved. Both gears may be moved out of engagement with the gear 15 but only one may be moved into engagement therewith.

As shown in Figs. 1 and 2, there is a multiple disc clutch which comprises a driving member 40 secured to gear 4 and this member carries a plurality of driving clutch discs 41. A plurality of driven discs 42 are mounted upon a hub member 43 splined or otherwise secured to the output shaft 2 as shown at 44. Within the member 40 and slidably mounted between its outer wall and extension on the gear 4 is a piston 45 provided with suitable seals as indicated. This piston is arranged to act upon the clutch discs on one side thereof and a fixed reaction member 46 is disposed on the opposite side of the clutch discs. This provides a cylinder arrangement with a chamber 47. The piston is normally held retracted against the end of the member 40 by suitable spring means such as a plurality of spring washers 48. When the clutch is engaged there is a direct connection between the shaft 1 and the shaft 2. When the clutch is disengaged there is no connection through the clutch between the shaft 1 and the shaft 2.

Figure 9:
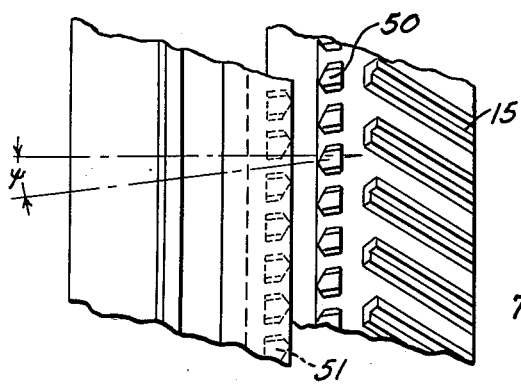
Fig. 9 is a developed plan view of the dentally engaging teeth in the transmission for providing one coupling therein.
Figure 10:
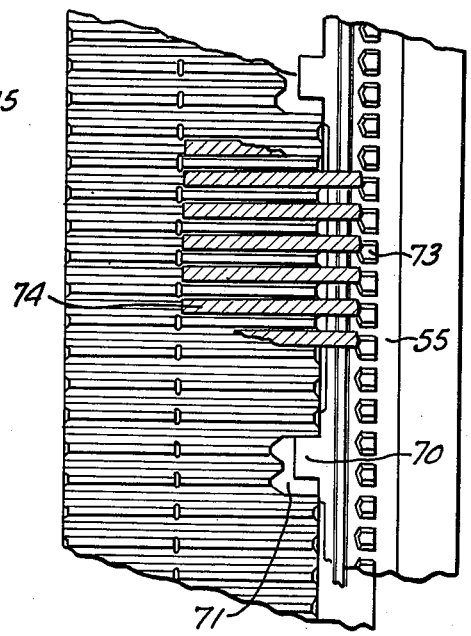
Fig. 10 is a developed view showing the blocked position of the parts which prevents dental engagement.
Figure 11:
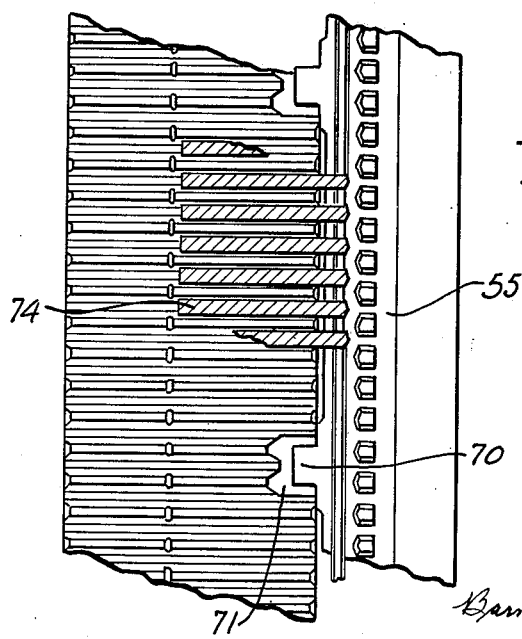
Fig. 11 is a view similar to Fig. 10 but showing the blocking teeth aligned in order to permit dental engagement of the teeth shown in Fig. 9.

There is a power coupler between the gear 15 and the output shaft 2. As illustrated in Figs. 2 and 9 the gear 15 is provided with a set of teeth 50 arranged to be dentally engaged with a set of teeth 51 on a coupler member 52 which is slidably splined as at 53 on the hub 43. These teeth are preferably helically disposed and in the present arrangement are provided with a left hand helix as shown in Fig. 9. The principles of this power coupler are shown and the power coupler is claimed in my Patent No. 2,371,564, of March 13, 1945. There is a blocker ring 55 which has a conical surface as indicated for engagement with an internal conical surface of a suitable friction ring 66 carried by the gear 15. This blocker ring has a sliding engagement with the coupler 52 herein accomplished by an expanding spring 67 positioned in a groove in a part of the blocker ring which telescopes into the coupler 52 and frictionally engages the interior of the coupler. Also, the blocker member 55 is capable of limited rotation relative to the coupler by tongues 70 which engage into recesses 71 in the coupler. See Figs. 10 and 11. Three of such tongues or recesses may be provided as shown in Fig. 6. The blocker element 55 is provided with blocker teeth 73 which are arranged to be positioned in and out of blocking relationship with cooperating teeth on the coupler. The cooperating teeth on the coupler, as shown at 74, are the splines which provide the slidable coupling between the coupler 52 and the hub 43.

At this point it seems advisable to describe the function of this power coupler from the standpoint of making and breaking the dental engagement between the teeth 50 and 51. When the teeth are in dental engagement as shown in Fig. 1, which figure also shows the friction clutch disengaged, the power is transmitted from the input shaft 1 through gear 4 through gear 6, gear 8, gear 15 (assuming gear 8 to be in engagement with gear 15) through the engaged teeth 50 and 51 through coupling 52 to hub 43 and to driven shaft 2. This, of course, provides a reduced ratio so that shaft 2 rotates at a speed lower than shaft 1. When the coupling is disestablished, as shown in Fig. 2, there is no connection between the input and output shafts through the teeth 50 and 51, but at this time the friction clutch may be engaged so as to provide a direct connection between the shafts as above set forth.

Let it be assumed that the parts are in the position shown in Fig. 2 with the teeth 50 and 51 disengaged and that a force is applied to the coupler tending to shift it to the right. The coupler may be shifted to the right and due to the yieldable association between the coupler and the blocking element 55 exerted by spring 67, the blocking member 55 is likewise shifted to the right and it engages the friction material 66.

Now, it will be appreciated that the gear 15 always rotates at a speed slower than that of the input shaft 1 and, so long as the friction clutch is engaged, rotates slower than the coupler 52. Accordingly, the friction on the coupler sets up a relative motion reaction in the direction shown in Fig. 10. This oscillates the blocker and positions its blocking teeth 73 in blocking position relative to the teeth 74 of the coupler and prevents further shift of the coupler to the right. This condition will be maintained so long as the relative motion reaction is maintained.

In the making of a shift from a condition where the friction clutch is engaged to a condition where the teeth 50 and 51 are engaged, the friction clutch starts to disengage by reason of the control action which will later be described. Assuming that the output shaft 2 rotates at a constant speed, the input shaft and the engine will begin to accelerate because of the slipping clutch. This accelerates gear 15 while the coupler continues at a substantially constant speed. When the gear 15 becomes substantially synchronized with the coupler and, more particularly, when it starts to overrun the coupler, the direction of relative motion reaction is reversed. At this time, the blocker ring is carried along with the gear 15 and its teeth 73 shift out of blocking position with respect to teeth 74. As a result, the coupler may shift to the right as Figs. 1 and 2 are viewed to cause a dental engagement of the teeth 50 and 51. This occurs substantially at the point of synchronization. The helical disposition of the dentally engaging teeth permit them to slide nicely into full engagement during that short period of relative rotational movement as the gear 15 is slightly overrunning the coupler. The coupling is established for the transmission of torque upon the cessation of movement to the right of the coupler.

The controlling means, as shown in Fig. 1, are of the type employed in an automotive vehicle and includes an accelerator pedal 80 which operates a fuel valve having an arm 81, through the means of a push rod 82, rocker member 83, and link 84. Also operated by the pedal is an arrangement for applying pressure to a master valve. This mechanism includes an arm 85 rockable with the arm 83, a link 86, a lever 87 for operating a spring 88 guided by a rod 89 which is connected to the lever 87. Mounted so as to be operated by the output shaft 2 is a pump 90. The details of this pump need not be described except to say that it has a cooperating rotary member 91 and 92 with a low pressure side having an intake 93 which extends into a liquid sump and an outlet or a high pressure side communicating with a high pressure line 94. The pump is equipped with a by-passing high pressure control valve 96 which governs the pressure and which has an outlet port 97. Suffice it to say that rotation of the pump members clockwise, as Fig. 5 is viewed, pumps the liquid, which may be a suitable oil, into the high pressure line 94.

As shown in Fig. 3, there is a master valve 100 having a chamber or cylinder with a valve piston therein having a land 101 and a land 102 with an intermediate reduced portion providing a passage 103. This valve may be of hollow form and the spring 88 extends into the same and exerts a downward pressure thereon. The valve has an extension or stop 103a for seating at the end of the cylinder. The high pressure line 94 has a port leading into the valve 100 as shown at 104, this port communicating into the space below the head 101. The high pressure line also has a port 105 which communicates into the passage 103. It will be apparent that the valve member is balanced with respect to the pressure in the passage 103 but is acted upon in opposing directions by the pressure entering port 104 and by the spring 88. The valve 100 has a port 106 which connects by a passage 107 to a port 108 in a relay valve 109.

The relay valve piston has a valving land portion 110 with a stopping projectiong 111 and a land 112 with an intermediate reduced portion providin a passage 113. The relay valve member is acted upon by a spring 116 so that it is pushed upwardly to its top position as shown in Fig. 3. The relay valve also has a bleed port 114. The high pressure line 94 communicates with the relay valve chamber through a port 118 and the relay valve chamber also has a port 120 which communicates with a pressure line 121 and a port 122 which communicates with an exhaust line 123 which is arranged to dump liquid into the sump at the intake of the pump.

The high pressure line 94 communicates with a passage 125 and the driving and driven shafts are formed to provide a passage 126 which communicates with a passage 125 by ports 127. The gear 4 is formed with passages 128 which communicate with passage 126 by ports 130 for the conducting of liquid under pressure into the cylinder space 47. Overflow or excess oil may escape from the passage 126 through ports 131 to the bearing for gear 15 and thus serve for lubrication purposes.

The pressure line 121 extends to a passage 135 which leads to a cylinder 136 in which cylinder is a piston 140. This is a controlling or servo piston and it carries a valve rod 141. This valve rod is provided with a valving head 142, a valving head 143 with an intermediate reduced portion 144 providing a port. The passage 125 is provided with a bleed port 146 for cooperation with the controlling valve and exhaust port 145 as will presently appear, and liquid under pressure may escape around the valve rod and through ports 147 in a sleeve surrounding the rod 141.

The sleeve which surrounds the rod is indicated at 150 and this sleeve carries a shifter member 151 which has a finger 152 which engages in a groove in the coupler 52. The sleeve is slidably mounted in the opposite walls of the casing, and as Fig. 1 is viewed. Surrounding the sleeve is a spring 157 which acts upon the shifter element 151 and reacts against a portion of the stationary housing 3 as shown, and the sleeve is preferably in axial alignment with the control piston 140.

The servo piston 140 is mounted on the rod 141 in fixed position and surrounding a portion of the piston rod is a spring 159, one end of which abuts the piston and the other end of which is arranged to act upon the piston rod and the sleeve 150. For this purpose, the rod 141 is reduced in diameter where the spring is mounted over the same to thus provide a shoulder 160. The sleeve is enlarged internally to receive the spring 159 and it has an internal shoulder 161. A washer 162 is disposed between the spring and the shoulder 160 and this washer has a diameter so as to abut the internal shoulder 161 on the sleeve. Also acting upon the piston and its rod is a spring 165 which reacts against the housing.

The spring 159 is normally under compression but the forces exerted thereby, when the parts are in the position shown in Fig. 1 and Fig. 2, are resolved locally in the piston rod because the ends of the spring act against the piston head and the shoulder 160. The two springs 157 and 159 have a rate relationship, as indicated by the diagrammatic view shown in Fig. 12, where the spring rates are indicated as lineal functions. The piston rod spring 159 has a rate of increasing resistance indicated by the line 159a and it will be noted that this is a relatively steep rate line. The spring 159 is preloaded. Of course, the showing in Fig. 12 is exemplary only, but in this example the spring 159 is pre-loaded to about 55 pounds. Should the piston and piston rod move to the left about $\frac{7}{16}''$ with the sleeve 150 remaining stationary the spring 159 is further compressed to a load of about 100 pounds as shown by the upper end of the line 159a. The sleeve spring 157 has a lower rate as indicated by the rate line 157a. In the Fig. 1 position, the spring 157 may be compressed so that it exerts a load of about 40 pounds. If the spring be further compressed by movement of the shifter member 151 about $\frac{7}{16}''$ to the left, as Fig. 1 is viewed, the spring load increases along the line 157 so that it exerts a load of about 48 pounds.

Figure 2A:
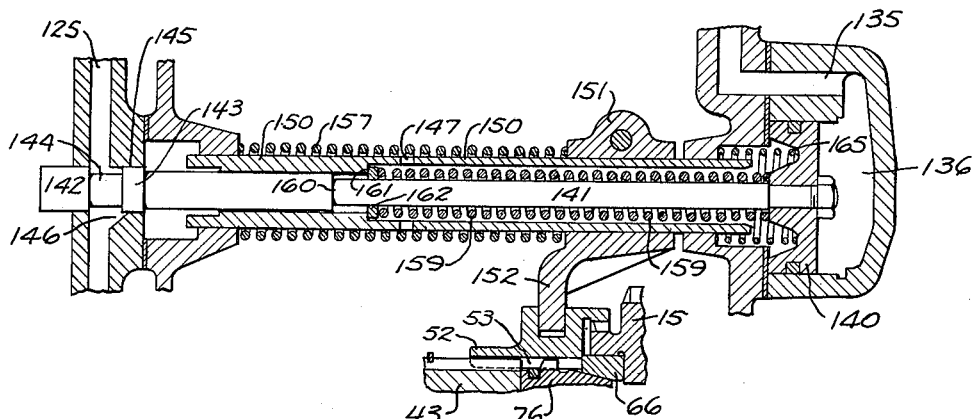
Fig. 2a is a cross sectional view showing operating parts in positions other than the positions of the parts shown in Figs. 1 and 2.

When the parts are in the position as shown in Fig. 1, with the forces of spring 159 locally overcome in the piston rod, the spring 157 holds the shifter to the right with a pressure of about 40 pounds and the teeth 50 and 51 are engaged. If hydraulic fluid under pressure is introduced into the cylinder, the piston and its rod move to the left and the spring 159 is compressed by this action so long as the sleeve 150 remains in position. This movement of the piston also compresses spring 165. In this situation, the spring 159 finds reaction in the shoulder 161 on the sleeve. If the piston and its rod complete its movement to the position shown in Fig. 2a, the spring 159 exerts about 100 pounds pressure. Considering the chart in Fig. 12, there is a net pressure tending to shift the sleeve 150 to the left of about 60 pounds. When the sleeve shifts from the Fig. 1 position to the Fig. 2 position, as will later appear in the description of the operation, the spring 157 is compressed so that it exerts about 48 pounds on the shifter, while the spring 159 is permitted to expand by movement of the sleeve but only to the extent of its preload so that it still acts on the sleeve and coupler with a pressure of about 55 pounds. This leaves a net spring pressure to the left on the sleeve and the shifter, as Fig. 2 is viewed, of about 7 pounds, which is adequate to hold the sleeve and coupler in position.

In considering the operation of the transmission, it might be reiterated that the construction shown is of a simple form showing two speed ratios and a reverse and that in direct drive, which may be termed the high speed ratio, torque is transmitted through the friction clutch and a 1:1 ratio is provided between the driving shaft 1 and the driven shaft 2. In this function, torque is transmitted through the clutch driving member 40, the driving discs, the driven discs, the member 43 and to the shaft 2. The gears at this time are idling. This is the condition illustrated in Fig. 2 where it will be noted that the coupler 52 is shifted so that the teeth 50 and 51 are out of engagement. When the torque is transmitted through the gearing, which may herein be considered the low speed ratio, the term low being used relative to the direct drive ratio, the parts are in the position shown in Fig. 1 with the friction clutch disengaged and with the coupler positioned for dental engagement of the teeth 50 and 51. The torque is now transmitted from gear 4 through gear 6, gear 8, gear 32, the dentally engaging teeth 50 and 51, the coupler 52, member 43 and to shaft 2.

The shift from one ratio to another is made automatically as determined by the combined factors of speed and the position of the accelerator pedal which normally determines the torque existing at the moment and to describe a shift, let it be assumed that the mechanism is in the low gear ratio as shown in Fig. 1 and that the engine is delivering torque through the transmission. The master valve 100 is the element which is directly under the influence of speed and the accelerator pedal and this valve performs the function of directing the flow of liquid under pressure. Under the conditions above specified and with the master valve in its lower position, as shown in Fig. 3, the pump, of course, is operating and liquid under pressure is delivered through the line 94. This liquid under pressure enters through port 104 and it acts in opposition to the spring 88. The liquid under pressure also flows to passage 125 but this passage is blocked by the valve head 142. It will be noted by reference to Fig. 1 that the servo piston 140 is retracted to its right hand position; that the relay valve is positioned upwardly in its cylinder so that the port 118 to the high pressure line is closed and the ports 120 and 122 and in communication so that the cylinder 136 is exhausted through the line 123. So long as there is no substantial change in the liquid pressure which acts upon the master valve and in the action of the spring 88, the master valve will remain in the position shown in Fig. 1 with no resultant change in the transmission. But the pressure varies with variation in the speed. If, for example, the automotive vehicle begins to travel up a hill the accelerator treadle may be depressed thus delivering more torque and putting more pressure on the spring 88 and without increasing the speed with the result that the parts remain in the low gear ratio as shown in Fig. 1.

Assuming, however, that the accelerator treadle remains relatively fixed and that the speed increases as the vehicle may travel along a level highway; the pressure increases and ultimately will overcome the spring 88 and shift the master valve upwardly to the position shown in Fig. 4. This dictates a change from the low ratio to the high or direct ratio. The port 106 is now open so that liquid under pressure passes through the passage 103 and into the upper end of the control or relay valve through the port 108. This pushes the control valve downwardly against the action of the spring 116. In this position the exhaust line 123 is first closed and then the high pressure liquid enters port 118, passes out through port 120 through the pressure line 121 to the servo cylinder 136. This starts movement of the servo piston 140 to the left as Fig. 1 is viewed. As the piston and its rod move to the left, the spring 159 is compressed as it reacts against the shoulder 161 of the sleeve. The sleeve and the slider are held in position by the combined forces of the spring 157 and by the frictional load on the dental teeth 50 and 51 and the frictional resistance of the coupler splines. This is particularly true if the torque load is heavy with the result that the piston and its piston rod may shift all the way to the position shown in Fig. 2a. In this movement, the exhaust port 145 is closed by the valve head 143 and the valve head 142 opens the pressure line 125 and liquid under pressure passes through ports 127 into passage 126 through ports 130 and passage 128 to the cylinder 47. This liquid pressure begins to shift the piston 45 to the right as Fig. 1 is viewed and begins engagement of the friction clutch.

At this time the delivered engine torque is divided, some of which is transmitted through the gearing to the dentally engaging teeth 50 and 51 and some of which is transmitted through the friction clutch and inasmuch as the driving ratios are different the divisions of torque oppose each other at the dentally engaging teeth. The precise manner of shift will be discussed later but for the present, we will continue with the description of the function of the controlling mechanism. Suffice it to say for the present, that the friction clutch continues its engaging action. The spring 159 is tending to shift the coupler to the left, as Fig. 1 is viewed, and the piston and its rod are substantially in the position shown in Fig. 2a. The torque load on the engaging teeth 50 and 51 and on the coupler splines plus the load of the spring 157 resist the action of the spring 159 and the shifter and coupler are held in the Fig. 1 position. As the friction clutch continues its engagement the torque load on the teeth reduces and when the torque load has been reduced to the point where the load on the teeth plus the load of spring 157 is inadequate to resist the spring 159, the shifter and coupler shift to the Fig. 2 position. The friction clutch continues engaging and finally becomes fully engaged. This is a direct drive position where the torque is transmitted directly through the friction clutch. The parts will remain in this position as determined by the dictates of speed and torque and the master valve and controlling valve will remain in the position shown in Fig. 4 until a change in one of the factors causes a shift of the master valve. If the liquid pressure diminishes or if pressure by the accelerator treadle position increases sufficiently or if there is a combined change of these two factors which results in a shift of the master valve back to the Fig. 3 position, then the pressure to the top of the control valve is cut off and the control valve is shifted upwardly by the spring 116 at which time the control valve may bleed through the ports 114. This cuts off the high liquid pressure from the cylinder 136 and the liquid is exhausted through the line 123. Accordingly, the servo piston 140 moves back to its right hand position shown in Fig. 1. The piston and its piston rod together with the spring 159 are moved back to the Fig. 1 position by the action of the spring 165. The forces of spring 165 are active only upon the hydraulic medium and do not influence the cooperating relationship of the springs 157 and 159. The position of the parts are now indicated in Fig. 2b, where it will be seen that the spring 159 has moved away from the shoulder 161 of the sleeve. This closes the pressure line 125 and opens the exhaust port 145 so that pressure in the cylinder 47 is relieved and the friction clutch begins to open. The opening or disengaging of the friction clutch may be controlled by the bleed port 146 which controls the exhaust of the liquid. At this moment there is not as yet sufficient movement of the shifter sleeve and the shifter 151 to cause a dental engagement due to the blocking action above described. In other words, the engine and driving shaft must accelerate to bring the gear 15 up to the point of synchronization with the coupler, at which time the blocker ring is oscillated to an unblocking position and then the shifter sleeve pops into position and the teeth 50 and 51 are dentally engaged to re-establish the low ratio. When the coupler is released by the blocker ring, the spring 157 shifts the sleeve and coupler to the right from blocked position to the Fig. 1 position, and this action is not affected by the spring 159.

Accordingly, it will be observed that the transmission and its automatic shift is under the combined influence and control of speed and torque. This is accomplished in part by liquid pressure which varies with speed and in part by the position of the accelerator which is a determining factor on the torque. The mechanism is to be properly coordinated so that a shift is made to a higher or a lower ratio depending upon the demand of speed and torque. We have described an example of a shift made from a low ratio to a direct drive ratio. Assume now that the parts are in a direct drive ratio as shown in Fig. 2 and a vehicle begins to go up an incline with a resultant drop in speed and a drop in the pump pressure. Upon the requisite drop in pressure, the master valve will shift from the Fig. 4 position to the Fig. 3 position and a shift will be made to the lower ratio. On the other hand, let it be assumed that the pressure remains constant and the accelerator be shifted to open the engine valve, then the master valve may be shifted down to effect a shift to the lower ratio.

The diagrams shown in Figs. 13 to 17 are illustrative of the function of the transmission when shifts are made. In this connection it may be pointed out at this time that a shift from the low ratio to the higher ratio is governed by the torque condition at the dentally engaging teeth 50 and 51. However, the shift from the higher ratio to the lower ratio is accompanied and controlled by the function of synchronizing the teeth to be dentally engaged.

Figure 13:
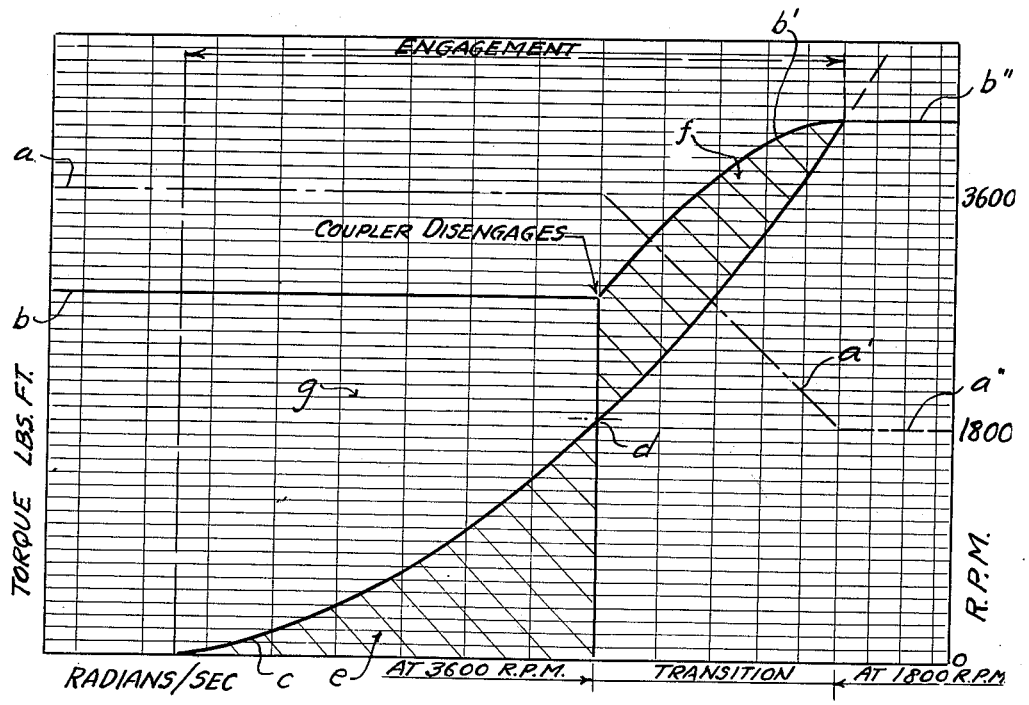
Fig. 13 is a diagrammatic layout illustrating what takes place when a shift is made in the transmission from a relatively low speed ratio to a relatively high speed ratio and at a relatively high torque.

All of the graphs shown in Figs. 13 to 17 are, of course, only exemplary. Fig. 13 represents a shift from a low speed ratio of 1:2 to a high or direct speed ratio of 1:1 and it is assumed that the shift is made at relatively high engine speeds. This graph assumes an engine speed of 3600 R. P. M. at the beginning of the shift represented by the line $a$ and at this speed the engine torque is indicated by the line $b$. As above described, the friction clutch starts engagement and its engagement curve is shown at $c$. As the friction clutch starts engagement some of the torque is divided and is transmitted to the dentally engaging teeth. This torque gradually increases as shown by the area $e$ and is in opposition to the torque delivered to the dental teeth through the gears as represented by the area $g$. However, as the friction clutch continues engagement, the torque transmitted thereby gradually increases along the curve $c$ and the torque delivered through the gearing is gradually decreased along the curve $c$ until the point $d$ is reached. At this point there is a momentary state of equilibrium when the two opposing torques delivered to the dentally engaging teeth are substantially balanced and the torque on the dental teeth is substantially zero. It will be observed, by reference to the chart of Fig. 13, that at this time ⅔ of the engine torque is delivered through the friction clutch and ⅓ through the gearing; this is due to the fact that the friction clutch delivers the torque directly whereas the gearing has a reduction of 1:2. It is to be noted that in any shift from a lower to a higher ratio, a part of the engine energy or horse power is uselessly expended in the slipping clutch. However, this slipping clutch is attempting to drive the output shaft at a higher speed than the dental coupling permits. Therefore, there is no torque bucking or opposition in the output shaft and therefore no sensation of such to the operator of the vehicle. The torque bucking which does occur is an internal affair in the transmission itself and occurs in conditioning the power coupler to a zero torque condition whereby it may automatically uncouple.

Now, during this engagement of the clutch, it will be remembered that the spring 159 is loading the coupler tending to shift the same out of dental engagement with the gear 15. In this connection it may be pointed out that the helical formation of the dental teeth 50 and 51 perform an important function. The helix is such, that when the torque is transmitted therethrough from the driving member to the driven member, that there is a tendency for the teeth to accept; in other words, the axial force on the coupler is to the right as Figs. 1 and 2 are viewed. At the point $d$ where the torque on the teeth is substantially zero, the teeth pop out of engagement. This may occur slightly beyond the point $d$ at the time when the friction clutch has reversed the torque on the dentally engaging teeth with the result that the direction of the helix aids in rejecting the coupler.

Since the dentally engaging teeth are now completely disengaged, the torque is transmitted entirely through the friction clutch, which, however, must continue its engaging action before it is completely engaged and all slippage ceases. The slippage of the clutch is illustrated by the area $f$. During this time the speed of the engine decelerates along the line $a'$ which, for clearness, is shown as a straight line function, until the speed of 1800 R. P. M. is reached, where the engine levels off at that speed. Also, the torque transmitted increases along the line $b'$ until the clutch is finally and completely engaged where the torque levels off along the line $b''$. This example has assumed a constant speed of the driven shaft and, therefore, the automotive vehicle, if it be considered that the mechanism is in an automotive vehicle. This example also assumes an internal combustion engine which has a torque curve which is about maximum at 1800 R. P. M., as shown by the line $b''$ but which is less at 3600 R. P. M. as shown by the line $b$.

Figure 14:
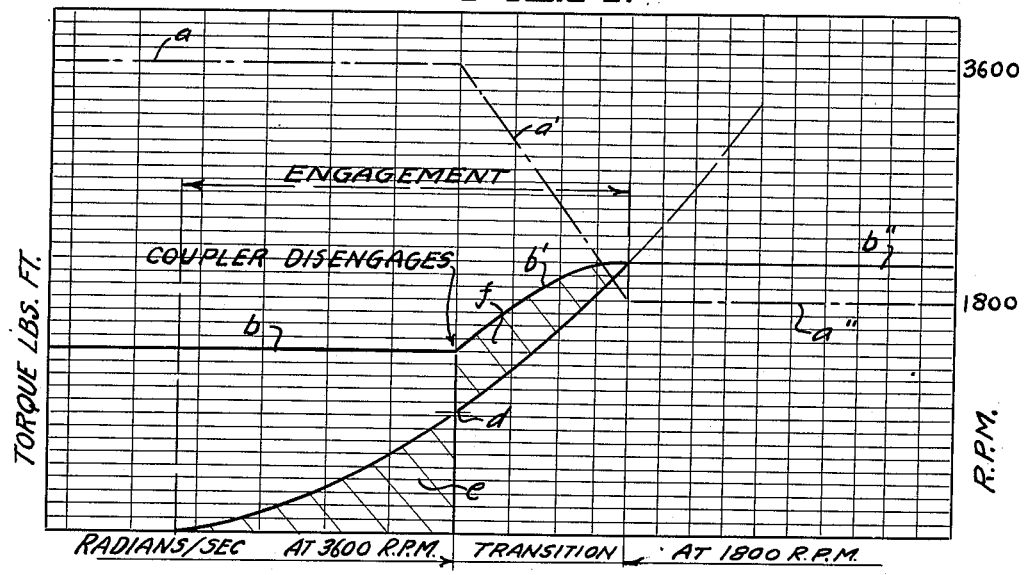
Fig. 14 is a view similar to Fig. 13 in illustration of a shift to a higher ratio but at a lower torque.

A shift to the high speed ratio under lower torque conditions is shown in Fig. 14. This graph, however, assumes the same engine speeds. The same reference letters are applied and the same overall functions occur. However, it will be noted that the shift is made over a shorter period of time. Both charts are divided horizontally to indicate radians per second, it being noted that the radians in the low gear condition have twice the length of the radians of the high gear condition, and the radians gradually change in the transition stage which exists from the moment of disengagement of the dentally engaging teeth at the point $d$ to the time when the friction clutch becomes completely engaged.

Figure 2B:
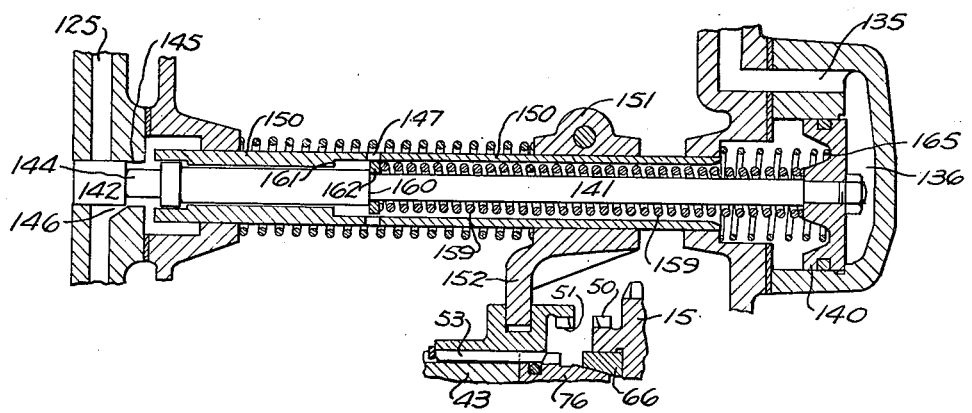
Fig. 2b is a cross sectional view similar to Fig. 2a showing the piston and its rod in still another position relative to the sleeve and coupler.
Figure 15:
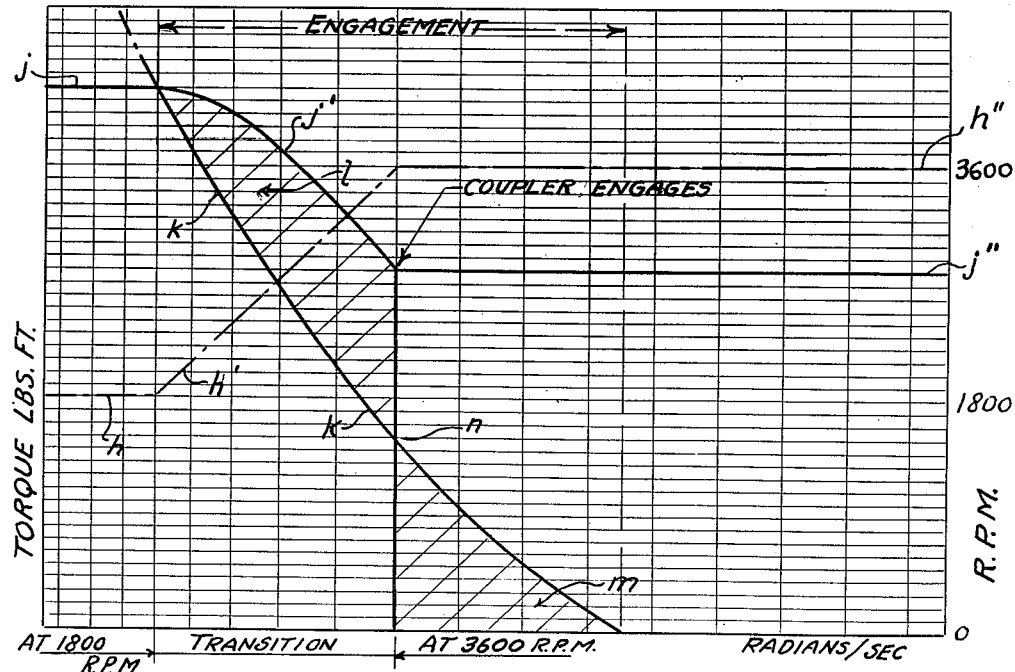
Fig. 15 is a diagrammatic view illustrating the shift of the transmission from a relatively high speed ratio to a relatively low speed ratio during the transmission of a relatively high torque.

Fig. 15 shows a graph indicating a shift from high speed ratio to low speed ratio at the engine speeds and under torque conditions similar to those shown in Fig. 13. The curve K is the curve of clutch disengagement and the disengagement begins at the top of the curve. The clutch begins to slip as represented by the area $l$ and the torque $j$ at the engine speed $h$ drops along the curve $j'$ while the engine speed is increasing along $h'$ which is indicated as a straight line function. It will be understood, of course, that in the direct drive position as shown in Fig. 2, that the gear 15 and the dental teeth 50 are operating at ½ the R. P. M. of the driving shaft and, therefore, the teeth 51. As the clutch begins to slip, it being appreciated that the position of the engine throttle is maintained, the speed of the engine increases. At this time, it will be remembered that the liquid pressure is being exhausted from the clutch cylinder 47 and that the pressure is being exhausted from the servo cylinder 136, and, as a result, the spring 165 shifts the servo piston and its rod to the right from the Fig. 2 position until the parts arrive at the position shown in Fig. 2b. It is, at this time, that the blocking function of the power coupler controls the situation. As above described, the coupler is urged to the right by spring 157, carrying with it the blocking element 55 through the yieldable connection 67. The blocking element frictionally engages the facing 66 and is oscillated by the slower moving gear 15 to the blocking position shown in Fig. 10 where the blocking teeth 73 lie in front of the spline teeth 74 on the coupler. As the friction clutch continues disengagement along the curve k and the engine speed increases along the curve h', the gear 15 increases its speed and finally reaches a point where it is synchronized with the coupler. Just as it moves over the point of synchronization and begins to overrun the coupler the direction of relative motion reaction is reversed and the coupler is oscillated to the position shown in Fig. 11, and at this instant, the loaded spring 157 pops the teeth 51 into dental engagement with the teeth 50. This occurs substantially at the point n. The torque is now divided, some being transmitted through the friction clutch and some through the engaging teeth and the clutch continues slippage along the curve k until it is completely disengaged. The area m illustrates the power loss due to the bucking torques during the final disengaging slippage action of the clutch.

Figure 16:
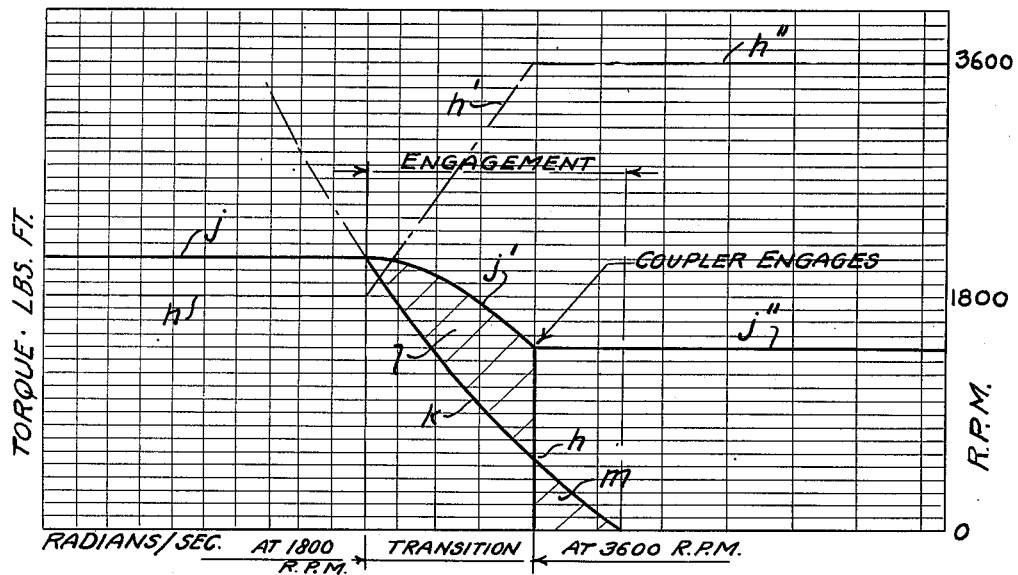
Fig. 16 is a view similar to Fig. 15 showing the shift to a lower speed ratio while transmitting a relatively lower torque.

Fig. 16 is a view similar to Fig. 15 but showing the shift from direct to low speed ratio at the same engine speeds, but at lower torque delivery. The reference characters are the same as those used in Fig. 15. It will be noted that the time period is considerably lessened.

Figure 17:
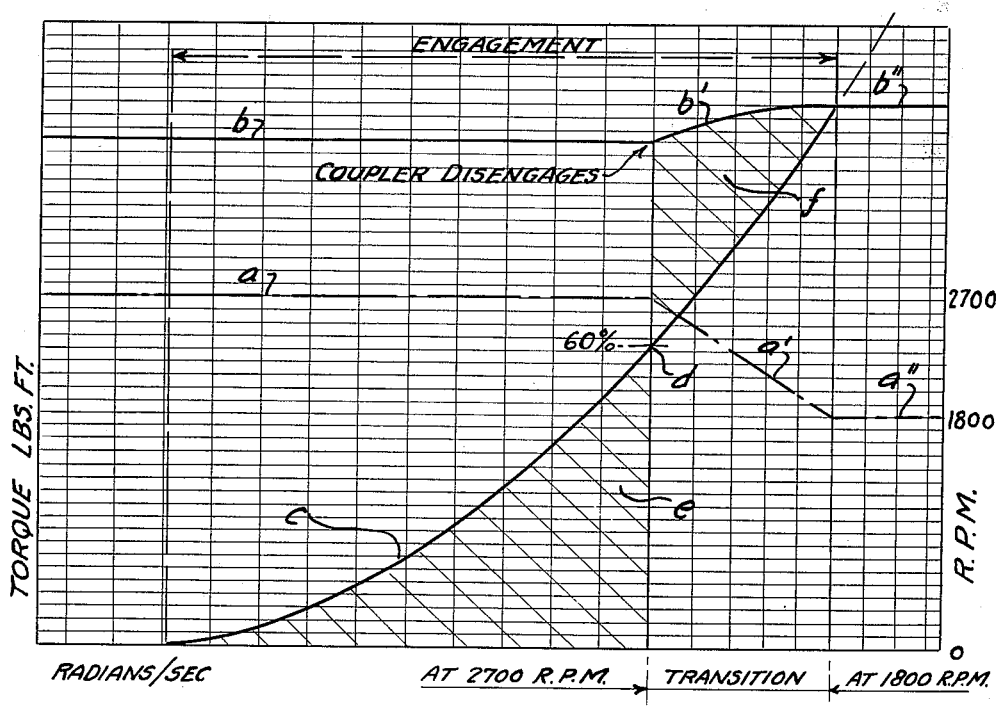
Fig. 17 is a view similar to Fig. 13 and illustrating a shift from a relatively low speed ratio to a relatively high speed ratio but where the relationship between the high and low ratios are different from that shown in Fig. 13.

Fig. 17 is a graph similar to Fig. 13 but showing a shift from a relatively low speed ratio to a higher speed ratio where the relationship is 1.5:1. In other words, the high ratio may be direct and the lower ratio may be 1:1.5. The same reference characters are employed as are used in Fig. 13, but it will be noted that the engine speed before the shift is in the vicinity of 2700 R. P. M. delivering torque b. The speed of the engine decreases as indicated at a' to about 1800 R. P. M. as indicated at a'', while the torque increases in the transition stage along the curve b' and levels off at b''. The point of dental disengagement is substantially at the location d. It will be noted that the torque transmitted through the friction clutch is proportionately lower because of the relationship of the high and low speeds. This, of course, would vary with all different relationships between the two ratios to and from which the shift is made. In all of the graphs from Figs. 13–17 inclusive, the ordinates represent torque in pounds-feet while the abscissa represent angular displacement in radians per second. By definition, the energy of a torque is that torque multiplied by its angular displacement. Therefore, any area such as e, g, or f represents energy per second and is likewise representative of horsepower. For example at the instantaneous point d (Figs. 13 or 14) substantially ⅔ of the engine horsepower is expended in the friction clutch while substantially ⅓ of the engine horsepower is being transmitted usefully to the output shaft. Immediately after the point d, substantially ⅔ of the engine horsepower is being expended in driving the output shaft, while substantially ⅓ of the engine horsepower is being expended in reducing engine speed. As time progresses during the shift more and more of the available horsepower is usefully expended in driving the output shaft, while less and less is uselessly expended in the area f to reduce engine speed to that dictated by the new driving ratio to the point where clutch slippage stops, the shift is completed, and all of the available horsepower flows through to the output shaft.

It will be noted that in every instance the loss of energy due to the bucking or opposing torque, during the shift, is minimized. As shown in Fig. 13, there is a loss indicated by the area e but the dental coupling lets go or disengages instantly and the remaining loss f is due only to the slippage of the clutch as it approaches full engagement. In shifting down to a lower ratio, as shown in Fig. 15, the area l indicates a loss as the friction clutch begins to slip but the dental engagement is made with instant action substantially at the point n, and the area m indicates a loss during the time the friction clutch is completing its disengaging action.

I claim:

1. A mechanism for transmitting torque comprising, a driving member, a driven member, said mechanism being operable under torque load to change the ratio between the driving member and the driven member, a friction clutch for connecting the members together at a relatively high speed ratio and arranged to be engaged and disengaged, connection means including cooperating teeth arranged to be dentally engaged and disengaged for connecting the members together at a relatively low speed ratio, some of the teeth being connected with the driving member and some of the teeth being connectable to the driving member through the friction clutch, and means operable to cause engagement of the friction clutch while the teeth are engaged whereby the torque delivered from the driving member is divided and delivered to the engaged teeth in opposing manner, said means being operable to cause disengagement of the teeth when the torque delivered to the engaged teeth through the friction clutch substantially equals the torque delivered to the teeth which are connected to the driving member.

2. A mechanism for transmitting torque comprising, a driving member, a driven member, said mechanism being operable under torque load to change the ratio between the driving member and the driven member, a friction clutch for connecting the members together at one speed ratio and arranged to be engaged and disengaged, means including a dental coupling for connecting the members together at a relatively low speed ratio and having a first coupling member with a set of teeth connected to the driving member and a second coupling member with a set of teeth connected to the driven member and connectable to the driving member through the friction clutch, at least one coupling member being shiftable for causing engagement and disengagement of the teeth, and means operable to cause engagement of the friction clutch while the teeth are engaged, whereby the torque delivered by the driving member to the dental coupling is divided and delivered to the engaged teeth in opposite manner, said means being operable to cause disengagement of the dental coupling when the torque delivered to the set of teeth of the second coupling member through the friction clutch substantially equals the torque delivered to the set of teeth of the first coupling member.

3. A mechanism for transmitting torque comprising, a driving member, a driven member, said mechanism being operable under torque load to change the ratio between the driving member and the driven member, a clutch for connecting the members together at a relatively high speed ratio and arranged to be engaged and disengaged, said clutch being of a type capable of slipping and capable of gradual engagement, means including a dental coupling for connecting the members together at a relatively low speed ratio and having a toothed first coupling member connected to the driving member and a toothed second coupling member connected to the driven member and connectable to the driving member through the clutch, and means operable to cause engagement of the clutch while the teeth are engaged, whereby the torque delivered by the driving member is divided and delivered in opposing manner to the dental coupling, said means being operable to cause disengagement of the dental coupling when the torque delivered to the second coupling member through the clutch substantially equals the torque delivered to the first coupling member.

4. A mechanism for transmitting torque comprising, a driving member, a driven member, said mechanism being operable under torque load to change the ratio between the driving member and the driven member, a clutch for connecting the members together at one ratio and arranged to be engaged and disengaged, said clutch being of a type capable of slipping and capable of gradual engagement, means including a dental coupling for connecting the members together at a different ratio and having a first toothed coupling member connected to the driving member and a second toothed coupling member connected to the driven member and connectable to the driving member through the clutch, and means operable to cause engagement of the clutch while the teeth are engaged, whereby the torque delivered by the driving member is divided and delivered in opposing manner to the dental coupling, said means being operable to cause disengagement of the dental coupling when the torque delivered to the teeth of the second coupling member through the clutch substantially equals the torque delivered to the teeth of the first coupling member.

5. A mechanism for transmitting torque comprising, a driving member, a driven member, said mechanism being operable under torque load to change the ratio between the driving member and the driven member, a friction clutch for conditioning the mechanism to provide for connecting the driving and driven members together at a relatively high speed ratio, said clutch arranged to be engaged and disengaged, connection means including cooperating teeth arranged to be dentally engaged and disengaed for conditioning the mechanism to provide a connection between the driving and driven members at a relatively low speed ratio, some of the teeth being connected to the driving member and some of the teeth being connected to friction clutch members, and means operable to cause engagement of the friction clutch while the teeth are engaged whereby the engaging teeth are subjected to opposing torques from two sources, namely, from the teeth which are connected to the driving member and from the teeth connected to the clutch, said means being operable to cause disengagement of the teeth when the torques to which the engaged teeth are subjected become substantially equal.

6. A mechanism for transmitting torque comprising, a driving member, a driven member, said mechanism being operable under torque load to change the ratio between the driving member and the driven member, a friction clutch for conditioning the mechanism to provide for connecting the driving and driven members together at one ratio, said clutch arranged to be engaged and disengaged, connection means including cooperating teeth arranged to be dentally engaged and disengaged for conditioning the mechanism to provide a connection between the driving and driven members at a different ratio, some of the teeth being connected to the driving member and some of the teeth being connected to friction clutch members, and means operable to cause engagement of the friction clutch while the teeth are engaged whereby the engaging teeth are subjected to opposing torques from two sources, namely, from the teeth which are connected to the driving member and from the teeth connected to the clutch, said means being operable to cause disengagement of the teeth when the torques to which the engaged teeth are subjected become substantially equal.

7. A mechanism for transmitting torque comprising, a driving member, a driven member, said mechanism being operable under torque load to change the ratio between the driving member and the driven member, a clutch operable to condition the mechanism for providing a driving connection between the driving member and the driven member at a relatively high speed ratio, said clutch arranged to be engaged and disengaged and being of a type capable of slipping and capable of gradual engagement, means including a dental coupling operable for conditioning the mechanism to provide a connection between the driving and driven members at a relatively low speed ratio, said dental coupling having a first set of teeth connected to the driving member, and a second set of teeth connected to the clutch, means operable to cause engagement of the clutch while the teeth of the coupling are engaged whereby opposing torques are delivered to the dental coupling through the first set of teeth and through the engaging clutch, said means being operable to cause disengagement of the dental coupling when the torques to which the coupling is subjected become substantially equal.

8. A mechanism for transmitting torque comprising, a driving member, a driven member, said mechanism being operable under torque load to change the ratio between the driving member and the driven member, a clutch operable to condition the mechanism for providing a driving connection between the driving member and the driven member at one ratio, said clutch arranged to be engaged and disengaged and being of a type capable of slipping and capable of gradual engagement, means including a dental coupling capable of engagement and disengagement and operable for conditioning the mechanism to provide a connection between the driving and driven members at another ratio, said dental coupling having a first set of teeth connected to the driving member, and a second set of teeth connected to the clutch, means operable to cause engagement of the clutch while the teeth of the coupling are engaged whereby opposing torques are delivered to the dental coupling through the first set of teeth and through the engaging clutch, said means being operable to cause disengagement of the dental coupling when the torques to which the coupling is subjected become substantially equal.

9. A mechanism for transmitting torque comprising, a driving member, a driven member, said mechanism being operable under torque load to change the ratio between the driving member and the driven member, a friction clutch directly associated between the driving member and the driven member for connecting the members directly together and arranged to be engaged and disengaged, said friction clutch adapted for gradual engagement accompanied by slippage, a dental coupling including two toothed members for connecting the driving member and the driven member together at a ratio other than direct, one of the toothed members being shiftable for engagement and disengagement of the teeth of the members, gearing connecting one toothed member to the driving member, the other toothed member being connected to the driven member and being connectable to the driving member through the friction clutch, means operable to cause engagement of the friction clutch while the dental coupling is engaged, whereby the torque delivered by the driving member is divided with some being transmitted to the dental coupling through the friction clutch and some delivered to the dental coupling in opposing manner through the gearing, said means being operable to cause disengagement of the dental coupling when the torque delivered to the coupling through the friction clutch has increased, due to the gradual engagement of the clutch, to the point where it substantially equals the torque delivered to the coupling through the gearing.

10. A mechanism for transmitting torque comprising, a driving member, a driven member, said mechanism being operable under torque load to change the ratio between the driving member and the driven member, a friction clutch for connecting the driving member and the driven member together at one ratio, said clutch arranged to be gradually engaged and disengaged accompanied by slippage, a dental coupling including two toothed members for connecting the driving member and the driven member together at another ratio, one of the toothed members being shiftable for engagement and disengagement of the teeth of the members, gearing connecting one toothed member to the driving member, the other toothed member being connected to the driven member and being connectable to the driving member through the friction clutch, means operable to cause engagement of the friction clutch while the dental coupling is engaged, whereby the torque delivered by the driving member is divided with some being transmitted to the dental coupling through the friction clutch and some delivered to the dental coupling in opposing manner through the gearing, said means being operable to cause disengagement of the dental coupling when the torque delivered to the coupling through the friction clutch has increased, due to the gradual engagement of the clutch, to the point where it substantially equals the torque delivered to the coupling through the gearing.

11. A mechanism for transmitting torque comprising, a driving member, a driven member, said mechanism being operable under torque load to change the ratio between the driving member and the driven member, a friction clutch directly associated between the driving member and the driven member for connecting the members directly together and arranged to be engaged and disengaged, said friction clutch adapted for gradual engagement accompanied by slippage, a dental coupling including two toothed members for connecting the driving member and the driven member together at a speed ratio lower than direct, one of the toothed members being shiftable for engagement of the teeth of the toothed members, gearing connecting one toothed member to the driving member, the other toothed member being connected to the driven member and being connectable to the driving member through the friction clutch, means operable to cause engagement of the friction clutch while the dental coupling is engaged, whereby the torque delivered by the driving member is divided with some being transmitted to the dental coupling in opposing manner through the friction clutch and some delivered to the dental coupling through the gearing, said means being operable to cause disengagement of the dental coupling when the torque delivered to the coupling through the friction clutch has increased, due to the gradual engagement of the clutch, to the point where it substantially equals the torque delivered to the coupling through the gearing.

12. A mechanism for transmitting torque comprising a driving member, a driven member, said mechanism being operable under torque load to change the ratio between the driving member and the driven member, a friction clutch for connecting the driving member and the driven member at one ratio, said clutch arranged to be engaged and disengaged, means including a dental coupling for connecting the driving member and the driven member together at a different ratio, said dental coupling including a toothed member connected to the driving member and a toothed member which is shiftable to establish and disestablish the dental engagement, the shiftable toothed member being connected to the driven member and connectable to the driving member through the clutch, control means operable to engage the clutch while the dental coupling is established, whereby the torque is divided and delivered to the dental coupling in opposing manner, said means being operable to shift the shiftable toothed member to disestablish the dental coupling when the divisions of torque delivered to the dental coupling become substantially equal, said control means being operable to disengage the friction clutch and to place a load on the shiftable member tending to shift it toward dental engaged position, blocking means for blocking movement of the shiftable toothed member, said blocking means being operable to release the blocking action when the two toothed members of the dental coupling become substantially synchronized whereby the shiftable member moves to dentally engaged position.

13. A mechanism for transmitting torque comprising, a driving member, a driven member, said mechanism being operable under torque load to change the ratio between the driving member and the driven member, a friction clutch for connecting the members together at one ratio, said clutch arranged to be engaged and disengaged accompanied by slippage, a dental coupling including two toothed members for connecting the driving member and the driven member together at a different ratio, one of the toothed members being shiftable for engagement and disengagement of the teeth of the toothed members, gearing connecting one toothed member to the driving member, control means operable to engage the clutch and to disengage the dental coupling, and operable to disengage the clutch and tend to engage the dental coupling, said control means including a shiftable element operable substantially when the torque delivered by the engaging clutch to the coupling substantially equals the torque delivered to the coupling through the gearing, and blocker means operable to block movement of the shiftable toothed member toward dentally engaged position as the friction clutch is releasing and operable to release the blocking action when the two toothed members of the dental coupling become substantially synchronized.

14. A mechanism for transmitting torque comprising, a driving member, a driven member, said mechanism being operable under torque load to change the ratio between the driving member and the driven member, a friction clutch for connecting the driving and driven members together at one ratio and arranged to be engaged and disengaged, means including a dental coupling for connecting the members together at a different ratio including two toothed members, one of which is connected to rotate with the driving member and the other of which is shiftable and connected to rotate with the driven member and connectable to the driving member through the friction clutch, operating and control means for engaging the clutch and shifting the shiftable toothed member to disengage the dental coupling when the torque delivered to the dental coupling by the engaging clutch is substantially equal to the torque delivered to the coupling through the toothed member connected by the driving member, said operating and control means being operable to disengage the clutch and to shift the shiftable toothed member to effect establishment of the dental coupling when the two toothed members become substantially synchronized.

15. A mechanism for transmitting torque comprising, a driving member, a driven member, said mechanism being operable under torque load to change the ratio between the driving member and the driven member, a friction clutch directly associated between the driving member and the driven member for connecting the members directly together and arranged to be engaged and disengaged accompanied by slippage, a dental coupling including two toothed members for connecting the driving and driven members together at a ratio lower than direct, gearing connecting the driving member and one toothed member so as to operate said toothed member lower than that of the speed of the driving member, means slidably connecting the other toothed member to the driven member, said other toothed member being connectable to the driving member through the friction clutch, means operable to engage and disengage the clutch, means operable to shift the shiftable toothed member out of dental engagement including an actuator effective substantially when the torque delivered to the dental coupling by the engaging clutch substantially equals that delivered to the coupling through the said one toothed member, the said means operable upon the shiftable member being effective as the friction clutch is disengaged to tend to shift the same toward dentally engaged position, blocker means effective by relative motion reaction for blocking movement of the shiftable toothed member to dentally engaged position and operable upon acceleration of the toothed member connected to the driving member substantially to the point of synchronization to the shiftable toothed member to release the blocking action for movement of the shiftable member to dentally engaged position.

16. In a transmission, a housing, a driving member entering the housing from one side thereof, a driven member entering the housing at the opposite side thereof and substantially co-axial with the driving member, a gear on the driving member adjacent said one side of the housing, another gear connectable to the driven member and positioned adjacent the other side of the housing, a counter-shaft and reverse shaft in the housing positioned equi-distant from the centers of the driving and driven members, the counter-shaft having first and second gears thereon, the reverse shaft having first and second gears thereon, the gear on the driving member and the first gears on the counter-shaft and reverse shaft being substantially in the same plane adjacent one side of the housing, the second gears on the counter-shaft and on the reverse shaft being shiftable and selectively engageable with said other gear and being positioned adjacent the opposite side of the housing, whereby to provide clearance in the central portion of the housing, the first gear on the counter-shaft engaging the gear on the driving member, the first gear on the reverse shaft engaging with and being smaller than the first gear on the counter-shaft so as to clear the gear on the driving member, and friction clutch means disposed in the central portion of the housing for coupling the driving and driven members together.

17. In a mechanism for transmitting torque, a driving member, a driven member, intermediate elements for connecting the driving and driven members together at different speed ratios, including a friction clutch for connecting the members together at one speed ratio and speed change means including a coupler having teeth thereon and a cooperating element having teeth thereon for connecting the members together at another speed ratio when the teeth on the coupler and the teeth on the cooperating element are dentally engaged, means for slidably mounting the coupler, said coupler being shiftable to positions where said teeth are engaged and disengaged respectively, operating means for causing engagement and disengagement of the friction clutch, the said means for slidably mounting the coupler and the dentally engaging teeth being angularly disposed helically relative to each other, whereby transmission of torque, when the teeth are dentally engaged, places a thrust on the coupler in a direction depending upon whether the torque is delivered from the driving member or the driven member, control means operable in timed relationship to the said operating means for placing a thrust on the coupler, said relative angle being such that the thrust caused thereby in a direction which tends to break the dental engagement is insufficient to shift the coupler due to the combined loads on the coupler, whereby the teeth remain dentally engaged upon torque reversal, said control means being operable to vary the thrust on the coupler for axial shift of the coupler to break the dental engagement when the thrust on the coupler incident to the transmission of torque is in a direction tending to break the dental engagement.

18. In a mechanism for transmitting torque, a driving member, a driven member, intermediate elements for connecting the driving and driven members together at different speed ratios, including a friction clutch for connecting the members together at one speed ratio and speed change means including a coupler having teeth thereon and a cooperating element having teeth thereon for connecting the members together at another speed ratio when the teeth on the coupler and the teeth on the cooperating element are dentally engaged, means for slidably mounting the coupler, said coupler being shiftable to positions where said teeth are engaged and disengaged respectively, operating means for causing engagement and disengagement of the friction clutch, the said means for slidably mounting the coupler and the dentally engaging teeth being angularly disposed helically relative to each other, whereby transmission of torque, when the teeth are dentally engaged, places a thrust on the coupler in a direction depending upon whether the torque is delivered from the driving member or the driven member, control means operable in timed relationship to the said operating means for placing a thrust on the coupler, said relative angle being such that the thrust caused thereby in a direction which tends to break the dental engagement is insufficient to shift the coupler due to the combined loads on the coupler, whereby the teeth remain dentally engaged upon torque reversal, said control means being operable to vary the thrust on the coupler for axial shift of the coupler to break the dental engagement when the thrust on the coupler incident to the transmission of torque is in a direction tending to break the dental engagement, said control means being operable to shift the coupler toward dentally engaged position and blocking means for preventing the coupler from shifting to dental engaged position while the coupler and the toothed element are dis-synchronized, the blocking means being operable for releasing the blocking action when the coupler and the toothed element become substantially synchronized.

19. In a mechanism for transmitting torque, a driving member, a driven member, intermediate elements for connecting the driving and driven members together at different speed ratios, including a friction clutch for connecting the members together at one speed ratio and speed change means including a coupler having teeth thereon and a cooperating element having teeth thereon for connecting the members together at another speed ratio when the teeth on the coupler and the teeth on the cooperating element are dentally engaged, means for slidably mounting the coupler, said coupler being shiftable to positions where said teeth are engaged and disengaged respectively, operating means for causing engagement and disengagement of the friction clutch, the said means for slidably mounting the coupler and the dentally engaging teeth being angularly disposed helically relative to each other so that when torque is transmitted from the driving member an axial thrust is placed on the coupler tending to hold the coupler in dentally engaged position, and so that when there is a torque reversal at the dentally engaging teeth, the axial thrust tends to shift the coupler out of dental engagement, the relative angle being such that the thrust upon such torque reversal is insufficient to shift the coupler, whereby the teeth remain dentally engaged, and control means operable in timed relationship with the said operating means for placing an axial thrust on the coupler for the shift of the coupler to break the dental engagement.

20. In a mechanism for transmitting torque, a driving member, a driven member, intermediate elements for connecting the driving and driven members together at different speed ratios, including a friction clutch for connecting the members together at one speed ratio and speed change means including a coupler having teeth thereon and a cooperating element having teeth thereon for connecting the members together at another speed ratio when the teeth on the coupler and the teeth on the cooperating element are dentally engaged, means for slidably mounting the coupler, said coupler being shiftable to positions where said teeth are engaged and disengaged respectively, operating means for causing engagement and disengagement of the friction clutch, the said means for slidably mounting the coupler and the dentally engaging teeth being angularly disposed helically relative to each other so that when torque is transmitted from the driving member an axial thrust is placed on the coupler tending to hold the coupler in dentally engaged position, and so that when there is a torque reversal at the dentally engaging teeth, the axial thrust tends to shift the coupler out of dental engagement, the relative angle being such that the thrust upon such torque reversal is insufficient to shift the coupler, whereby the teeth remain dentally engaged, and control means operable in timed relationship with the said operating means for placing an axial thrust on the coupler for the shift of the coupler to break the dental engagement, said control means also being operable for shift of the coupler toward dentally engaged position and blocking means for blocking movement of the coupler toward dentally engaged position while the coupler and the toothed element are dis-synchronized, the blocking means being operable by said toothed element for releasing the blocking action when the toothed element and the coupler become substantially synchronized.

21. A mechanism for transmitting torque comprising, a driving member, a driven member, said mechanism being operable under torque load to change the speed ratios between the driving member and the driven member, a friction clutch for conditioning the mechanism to provide for connecting the driving and driven members together at one speed ratio, said clutch arranged to be engaged and disengaged accompanied by slippage, gearing associated with the driving and driven members, means for conditioning the gearing for connecting the driving and driven members together at a different speed ratio, including, two toothed members, one of which is a slidable coupler and the other of which is adapted to have its teeth dentally engaged and disengaged by the teeth of the slidable coupler, control means operable to engage the clutch and to disengage the dental coupling and operable to disengage the clutch and to engage the dental coupling, said control means including a shiftable element operable for shifting the coupler to disengage the dental coupling substantially when the torque delivered through the engaging clutch to the engaged teeth substantially equals the torque delivered to the engaged teeth through the gearing.

22. A mechanism for transmitting torque comprising, a driving member, a driven member, said mechanism being operable under torque load to change the speed ratios between the driving member and the driven member, a friction clutch for conditioning the mechanism to provide for connecting the driving and driven members together at one speed ratio, said clutch arranged to be engaged and disengaged accompanied by slippage, gearing associated with the driving and driven members, means for conditioning the gearing for connecting the driving and driven members together at a different speed ratio, including, two toothed members, one of which is a slidable coupler and the other of which is adapted to have its teeth dentally engaged and disengaged by the teeth of the slidable coupler, and means operable to cause engagement of the friction clutch while the teeth of the said two toothed members are dentally engaged, whereby the teeth are subjected to torque from two sources, namely, from the engaging clutch and from the gearing, and means operable to cause disengagement of the teeth when the torques to which the engaged teeth are subjected become substantially equal.

23. A mechanism for transmitting torque comprising, a driving member, a driven member, said mechanism being operable under torque load to change the speed ratios between the driving member and the driven member, a friction clutch for conditioning the mechanism to provide for connecting the driving and driven members together at one speed ratio, said clutch arranged to be engaged and disengaged accompanied by slippage, gearing associated with the driving and driven members, means for conditioning the gearing for connecting the driving and driven members together at a different speed ratio, including, two toothed members, one of which is a slidable coupler and the other of which is adapted to have its teeth dentally engaged and disengaged by the teeth of the slidable coupler, control means operable to engage the clutch and to disengage the dental coupling and operable to disengage the clutch and to engage the dental coupling, said control means including a shiftable element operable for shifting the coupler to disengage the dental coupling substantially when the torque delivered through the engaging clutch to the engaged teeth substantially equals the torque delivered to the engaged teeth through the gearing, and blocker means operable to block movement of the coupler toward dentally engaged position as the friction clutch is releasing and operable to release the blocking action when the two toothed members become substantially synchronized.

24. A mechanism for transmitting torque comprising, a driving member, a driven member, said mechanism being operable under torque load to change the ratio between the driving member and the driven member, a friction clutch for conditioning the mechanism to provide for connecting the driving and driven members together at one ratio, said clutch arranged to be engaged and disengaged, gearing associated with the driving and driven members, connection means including cooperating teeth arranged to be dentally engaged and disengaged for conditioning the gearing to provide a connection between the driving and driven members at a different speed ratio when engaged, the teeth being so associated with the friction clutch and the gearing that when the teeth are engaged torque may be transmitted thereto through the clutch and through the gearing, and means operable to cause engagement of the friction clutch while the teeth are engaged, whereby the teeth are subjected to torque transmitted through the engaging clutch and through the gearing, and means operable to cause disengagement of the teeth when the torques to which the engaged teeth are subjected become substantially equal.

25. A mechanism for transmitting torque comprising, a driving member, a driven member, said mechanism being operable under torque load to change the ratio between the driving member and the driven member, a friction clutch for conditioning the mechanism to provide for connecting the driving and driven members together at a relatively high speed ratio, said clutch arranged to be engaged and disengaged and being of the type capable of slipping and capable of gradual engagement, gearing associated with the driving and driven members, connection means including cooperating teeth arranged to be dentally engaged and disengaged for conditioning the gearing to provide a connection between the driving and driven members at a relatively lower speed ratio when engaged, the teeth being so associated with the friction clutch and the gearing that when the teeth are engaged torque may be transmitted thereto through the clutch and through the gearing, and means operable to cause engagement of the friction clutch while the teeth are engaged, whereby the teeth are subjected to opposing torques transmitted through the engaging clutch and through the gearing and means operable to cause disengagement of the teeth when the torques to which the engaged teeth are subjected become substantially equal.

ERNEST E. WEMP.

REFERENCES CITED

The following references are of record in the file of this patent:

UNITED STATES PATENTS

| Number | Name | Date |
|---|---|---|
| 1,838,096 | Fleischel | Dec. 29, 1931 |
| 1,920,579 | Mock | Aug. 1, 1933 |
| 2,181,647 | Wheaton | Nov. 28, 1939 |
| 2,193,305 | Thompson | Mar. 12, 1940 |
| 2,221,393 | Carnegie | Nov. 12, 1940 |
| 2,342,960 | Neracher et al. | Feb. 29, 1944 |
| 2,398,407 | Brownyer | Apr. 16, 1946 |
| 2,402,248 | Hale | June 18, 1946 |
| 2,430,799 | Aspinwall | Nov. 11, 1947 |